United States Patent
Zhang et al.

(10) Patent No.: US 9,776,123 B2
(45) Date of Patent: Oct. 3, 2017

(54) SYSTEM AND METHOD FOR PURIFYING MOTHER LIQUID STEAM OF POLYTETRAFLUOROETHYLENE DISPERSION LIQUID

(75) Inventors: Jingang Zhang, Zigong (CN); Jia Li, Zigong (CN); Jinsong Zhang, Zigong (CN); Yong Xu, Sichuan (CN); Xiulin Chen, Sichuan (CN)

(73) Assignee: Zhonghao Chenguang Research Institute of Chemiccal Industry Company Limited, Zigong (CN)

( * ) Notice: Subject to any disclaimer, the term of this patent is extended or adjusted under 35 U.S.C. 154(b) by 462 days.

(21) Appl. No.: 14/378,632

(22) PCT Filed: Aug. 2, 2012

(86) PCT No.: PCT/CN2012/079552
§ 371 (c)(1),
(2), (4) Date: Aug. 13, 2014

(87) PCT Pub. No.: WO2013/143246
PCT Pub. Date: Oct. 3, 2013

(65) Prior Publication Data
US 2015/0165363 A1    Jun. 18, 2015

(30) Foreign Application Priority Data
Mar. 31, 2012 (CN) .......................... 2012 1 0092737

(51) Int. Cl.
*B01D 19/02* (2006.01)
*B01D 53/14* (2006.01)
(Continued)

(52) U.S. Cl.
CPC ......... *B01D 50/00* (2013.01); *B01D 19/0036* (2013.01); *B01D 19/0042* (2013.01);
(Continued)

(58) Field of Classification Search
CPC B01D 19/0036; B01D 19/0042; B01D 19/02; B01D 2257/2066; B01D 50/00;
(Continued)

(56) References Cited

U.S. PATENT DOCUMENTS 4,778,489 A    10/1988  Weber
2010/0248132 A1*   9/2010  Sensui ................. G03G 9/0806
                                                       430/137.16

FOREIGN PATENT DOCUMENTS

CN    1127452 C       11/2003
CN    1205116 C        6/2005
CN    101254397 A      9/2008

* cited by examiner

*Primary Examiner* — Duane Smith
*Assistant Examiner* — Cabrena Holecek
(74) *Attorney, Agent, or Firm* — McDermott Will & Emery LLP

(57) ABSTRACT

A system for purifying mother liquid steam of polytetrafluoroethylene dispersion liquid comprises a concentration kettle (1), a defoaming pot (2), a gas-liquid separator (3) and a falling film absorption tower (4). A steam exit of the concentration kettle (1) is connected to an entrance of the defoaming pot (2). An exit of the defoaming pot (2) is connected to a feeding port of the gas-liquid separator (3). A gas exit of the gas-liquid separator (3) is connected to the falling film absorption tower (4). A liquid exit of the gas-liquid separator (3) is connected to the concentration kettle (1). A method for purifying mother liquid steam of polytetrafluoroethylene dispersion liquid by using the system is further provided.

16 Claims, 1 Drawing Sheet

(51) Int. Cl.
*B01D 50/00* (2006.01)
*B01D 19/00* (2006.01)
*B01D 53/70* (2006.01)
*B01D 53/78* (2006.01)

(52) U.S. Cl.
CPC ........... *B01D 19/02* (2013.01); *B01D 53/145* (2013.01); *B01D 53/1418* (2013.01); *B01D 53/70* (2013.01); *B01D 53/78* (2013.01); *B01D 2257/2066* (2013.01)

(58) Field of Classification Search
CPC .. B01D 53/1418; B01D 53/145; B01D 53/70; B01D 53/78
USPC ................................ 570/177; 528/502 R, 501
See application file for complete search history.

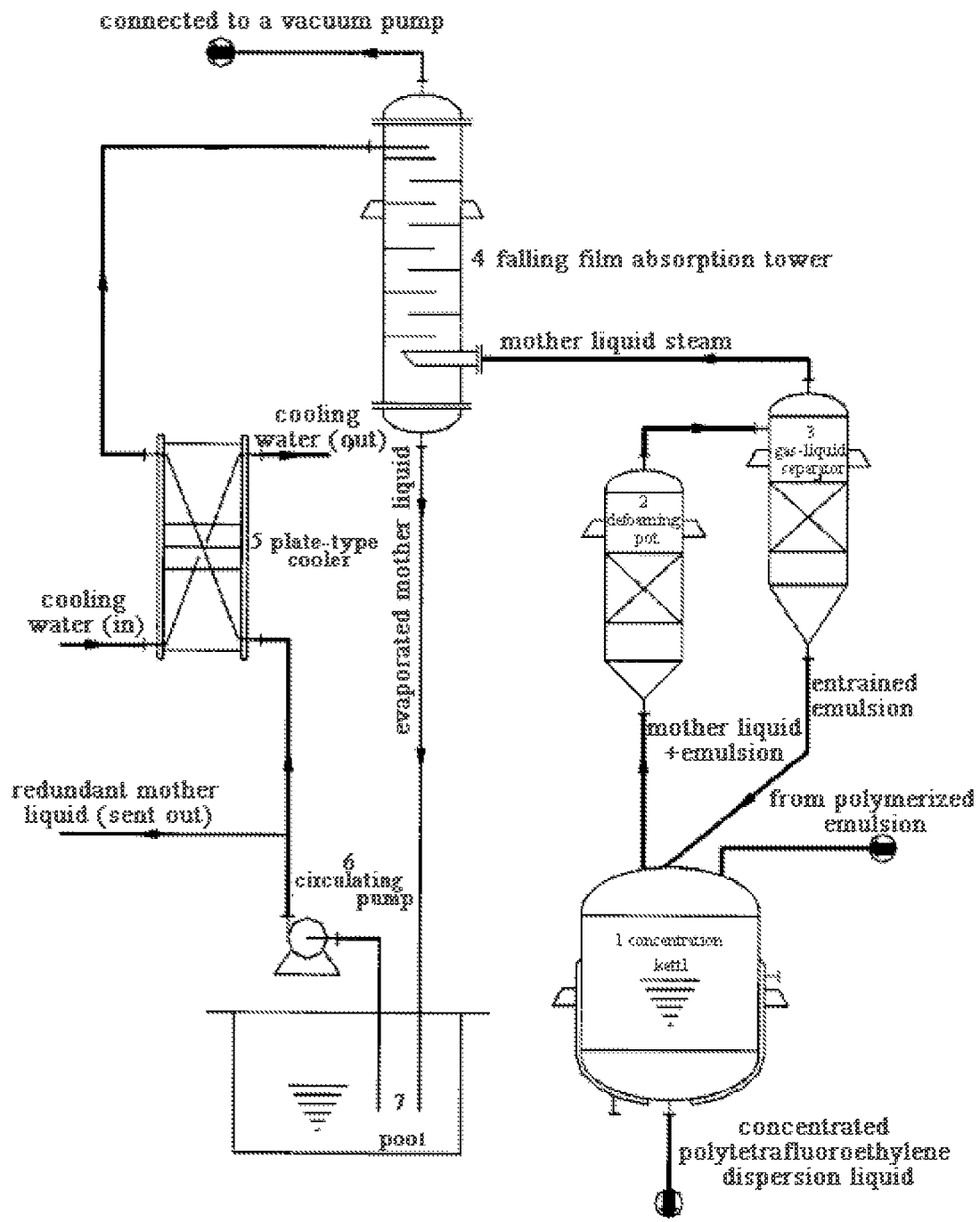

SYSTEM AND METHOD FOR PURIFYING MOTHER LIQUID STEAM OF POLYTETRAFLUOROETHYLENE DISPERSION LIQUID

TECHNICAL FIELD

The present invention relates to the field of separating impurities from a steam, and particularly relates to a system and method for purifying a steam containing polytetrafluoroethylene by directly contacting with a liquid as heat transfer medium.

BACKGROUND ART

There are two ways of producing a polytetrafluoroethylene dispersed concentrated liquid: one is chemical concentration, the other is vacuum concentration. Since the chemical concentration method will generate a large quantity of organic waste water, it is seldom used in the production process, so the vacuum concentration method is given priority at present.

The conventional vacuum concentration method is that a dispersed emulsion (mother liquid) is absorbed into a concentration kettle in the vacuum state, and then is heated by a jacket so that the emulsion is boiled at about 50° C. to evaporate the water inside the emulsion. Since the evaporated steam (steam of mother liquid) is entrained with a large quantity of products and emulsion, it is necessary to arrange a purifying system to separate the products and the emulsion, and finally the steam is further absorbed by the absorption tower. A currently common method for preparing polytetrafluoroethylene concentrated liquid is vacuum concentration, in order to prevent the polytetrafluoroethylene emulsion from demulsification at a high concentration. A large quantity of emulgators are added into the concentration kettle, which can easily form a lot of foam entrainment in the evaporation process, and it is inevitable for a part of the emulsion and emulgators to be carried into the steam absorption tower with evaporation of the steam, resulting in the absorbed liquid polluted, thus it has to be directly discharged without being further used as industrial water. A concentration kettle with an annual output of 180 tons of PTFE emulsion needs to consume hundreds of thousands of fresh water per year.

In order to save water resource and reduce cost, it is necessary to develop a technology for purifying mother liquid steam of polytetrafluoroethylene dispersion liquid, the water in the steam can be purified and used in circulations by means of equipment reforms and improvement on operational process, etc.

SUMMARY

The objective of the present invention is to provide a system for purifying mother liquid steam of polytetrafluoroethylene dispersion liquid with respect to the problem of a large consumption of water existed in the prior art.

Another objective of the present invention is to provide a method for purifying mother liquid steam of polytetrafluoroethylene dispersion liquid.

The objectives of the present invention are fulfilled by the following technical solutions:

A system for purifying mother liquid steam of polytetrafluoroethylene dispersion liquid, used for purifying the mother liquid steam generated by a concentration kettle, which comprises a defoaming pot, a gas-liquid separator and a falling film absorption tower, wherein a steam exit of the concentration kettle is connected to an entrance of the defoaming pot, an exit of the defoaming pot is connected to a feeding port of the gas-liquid separator, a gas exit of the gas-liquid separator is connected to the falling film absorption tower, and a liquid exit of the gas-liquid separator is connected to the concentration kettle.

Wherein, the defoaming pot is provided with 2-10 polyporous plates arranged horizontally; the gas-liquid separator is provided with 2-10 baffles arranged horizontally. The defoaming pot is provided with polyporous plates in multiple layers, a lot of holes are punched on the plates, to achieve the objective of quick gas-liquid separation and defoaming; the gas-liquid separator is provided with baffles inside, with airflow passages between the baffles, to achieve the objective of gas-liquid separation; the absorption tower is the conventional falling film absorption tower with multiple layers inside, when cooling water flows down from the uppermost plate, it will form a uniform water film, and when the gas rises up, it has to penetrate through this water film to go out, so as to achieve the objective of absorption.

Wherein, the purification system further comprises a pool sealed with water, a circulation pump and a plate type cooler, the pool is connected to an exit of the falling film absorption tower, the plate type cooler is connected to the pool by the circulation pump, a water exit of the cooled water of the plate type cooler is connected to an absorbent entrance of the falling film absorption tower, the top of the falling film absorption tower is connected to a vacuum pump.

A method for purifying mother liquid steam of polytetrafluoroethylene dispersion liquid using the system comprises: evaporating and concentrating the polytetrafluoroethylene dispersion liquid in the concentration kettle, transporting the evaporated mother liquid steam into the defoaming pot to be defoamed, transporting the defoamed mother liquid steam into the gas-liquid separator, transporting the separated mother liquid steam into the falling film absorption tower to be absorbed as a liquid, returning the liquid separated out from the gas-liquid separator to the concentration kettle.

Wherein, the polytetrafluoroethylene dispersion liquid comprises 20~30% polytetrafluoroethylene and 6~8% emulgator sodium dodecylbenzene sulphonate by mass content.

Wherein, the concentration kettle has a pressure of −0.08~0.09 MPa and a temperature of 50~55° C.

Wherein, the defoaming within in the defoaming pot is carried out by means of bubble breakage when the bubbles pass through the polyporous plates. In order to prevent the PTFE dispersion emulsion from demulsification, a large quantity of emulgators have to be added into the emulsion, since the emulgator is a surfactant, in the evaporation and concentration process, a part of emulsion will be entrained out with the steam in the form of foams. As The defoaming pot is additionally provided with polyporous plates in multiple layers, a lot of holes are punched on the polyporous plates, which allows the rising gas flow to have to pass through the holes to go out, when the rising bubbles pass through the holes, they will be blocked by the holes and thus broken rapidly, so as to achieve the objective of defoaming. Such improvement can make the defoaming effect more complete, which ensures the emulgators will not be entrained out.

Wherein, the obtained liquid absorbed by the falling film absorption tower is the water having a conductivity of 0.2~1 $\mu s \cdot cm^{-1}$.

Wherein, the obtained liquid absorbed by the falling film absorption tower enters into the pool, and used in industry.

Wherein, the obtained liquid absorbed by the falling film absorption tower is transported to a plate type cooler for cooling using a circulation pump, and then used as an absorbent of the falling film absorption tower.

The beneficial effects of the present invention:

By arrangement of devices such as a defoaming pot, a gas-liquid separator and a falling film absorption tower, etc., the system of the present invention effectively remove the products and emulgators in the concentration and evaporation processes, the obtained mother liquid is used in circulations as purified water, each concentration system can save water consumption of about 65 thousand tons per year, so the economic and social effects are significant. The method of the present invention is an improvement on the conventional vacuum concentration method, after the concentrated and evaporated mother liquid is subject to particular purification treatments such as defoaming, gas-liquid separation, etc., the obtained mother liquid is very pure, and after cooling, it can be used in circulations as an absorbent or used in circulations as industrial water.

BRIEF DESCRIPTION OF THE DRAWINGS

FIG. 1 is a process flow chart for purifying evaporated mother liquid of polytetrafluoroethylene dispersion liquid according to examples 1~4 of the present invention. In the FIGURE, 1—concentration kettle, 2—defoaming pot, 3—gas-liquid separator, 4—falling film absorption tower, 5—plate-type cooler, 6—circulating pump, 7—pool.

DETAILED DESCRIPTION OF PREFERRED EMBODIMENTS

The following embodiments are used for illustrating the present invention, but not used for limiting the scope of the present invention.

Example 1: A System for Purifying Mother Liquid Steam of Polytetrafluoroethylene Dispersion Liquid Refer to FIG. 1, a system for purifying mother liquid steam of polytetrafluoroethylene dispersion liquid comprises a concentration kettle 1, a defoaming pot 2, a gas-liquid separator 3, a falling film absorption tower 4, a pool 7, a circulating pump 6 and a plate-type cooler 5, wherein the concentration kettle 1 has a volume of 4 $m^3$, a diameter of 1700 mm and a height of 1800 mm; the defoaming pot 2 has a volume of 0.8 $m^3$, a diameter of 700 mm and a height of 2000 mm. It is provided with 10 horizontal polyporous plates inside which have 100 holes with a diameter of 10 mm. The number of the polyporous plates is adjustable between 2 to 10 according to the amount of emulgators in the treated mother liquid and the amount to be treated. The gas-liquid separator 3 has a volume of 0.8 $m^3$, a diameter of 700 mm, a height of 2000 mm, provided with 10 baffles inside, with airflow passages between the baffles, the number of the baffles can be adjusted between 2 to 10 according to the amount to be treated. The falling film absorption tower 4 has a diameter of 600 mm and a height of 4000 mm. A steam exit of the concentration kettle 1 is connected to an entrance of the defoaming pot 2. An exit of the defoaming pot 2 is connected to a feeding port of the gas-liquid separator 3. A gas exit of the gas-liquid separator 3 is connected to the falling film absorption tower 4. A liquid exit of the gas-liquid separator 3 is connected to the concentration kettle 1. A cooled water exit of the plate type cooler 5 is connected to an absorbent entrance of the falling film absorption tower 4, the top of the falling film absorption tower 4 is connected to a vacuum pump (providing a vacuum for the whole evaporation system). The pipelines of an entrance of the pool 7 are provided with liquid seals.

Example 2

Refer to FIG. 1, the polytetrafluoroethylene dispersion liquid is added into the concentration kettle 1. The dispersion liquid comprises 20% polytetrafluoroethylene and 7% emulgators which are evaporated and concentrated in the concentration kettle 1 at a pressure of −0.085 MPa and a temperature of 52° C. The evaporated mother liquid steam enters into the defoaming pot 2 to be defoamed. The defoamed mother liquid steam enters into the gas-liquid separator 3. The separated mother liquid steam enters into the falling film absorption tower 4 to be absorbed as a liquid, and the liquid separated out from the gas-liquid separator 3 returns to the concentration kettle 1. The absorbent in the falling film absorption tower 4 is the clean mother liquid transported from the pool 7. The liquid obtained by the falling film absorption tower 4 has a conductivity of 1.0 μs/cm, a salt content of 0.9 mg/L which meets the standard of pure water. The liquid obtained by the falling film absorption tower 4 is stored into the pool 7, transported to plate-type cooler 5 by means of a circulation pump, cooled to about 30° C., and then enters into the top of the falling film absorption tower 4 to be used as a absorbent.

Example 3

Refer to FIG. 1, the polytetrafluoroethylene dispersion liquid is added into the concentration kettle 1, the dispersion liquid comprises 15% polytetrafluoroethylene and 8% emulgators which are evaporated and concentrated in the concentration kettle 1 at a pressure of −0.09 MPa and a temperature of 50° C. The evaporated mother liquid steam enters into the defoaming pot 2 to be defoamed. The defoamed mother liquid steam enters into the gas-liquid separator 3. The separated mother liquid steam enters into the falling film absorption tower 4 to be absorbed as a liquid. The liquid separated out from the gas-liquid separator 3 returns to the concentration kettle 1. The absorbent in falling film absorption tower 4 is the clean mother liquid transported from the pool 7. The liquid obtained by the falling film absorption tower 4 has a conductivity of 0.8 μs/cm, a salt content of 0.7 mg/L which meets the standard of pure water. The liquid obtained by the falling film absorption tower 4 is stored into the pool, and then transported to a boiler for use by means of pipelines.

Example 4

Refer to FIG. 1, the polytetrafluoroethylene dispersion liquid is added into the concentration kettle 1. The dispersion liquid comprises 25% polytetrafluoroethylene and emulgators which are evaporated and concentrated in the concentration kettle 1 at a pressure of −0.08 MPa and a temperature of 55° C. The evaporated mother liquid steam enters into the defoaming pot 2 to be defoamed. The defoamed mother liquid steam enters into the gas-liquid separator 3. The separated mother liquid steam enters into the falling film absorption tower 4 to be absorbed as a liquid. The liquid separated out from the gas-liquid separator 3 returns to the concentration kettle 1. The absorbent in the falling film absorption tower 4 is the clean mother liquid transported from the pool 7. The liquid obtained by the falling film absorption tower 4 has a conductivity of 0.3 µs/cm, a salt content of 0.5 mg/L which meets the standard of pure water.

The embodiments above are only descriptions for the embodiments of the present invention, but not a limit to the scope of the present invention. Without departing from the spirit of design of the present invention, various modifications and improvements made by a person skilled in the art will all fall into the scope defined by the claims of the present invention.

INDUSTRIAL APPLICABILITY

A system for purifying mother liquid steam of polytetrafluoroethylene dispersion liquid provided by the present invention comprises a concentration kettle, a defoaming pot, a gas-liquid separator and a falling film absorption tower. The present invention further provides a method for purifying mother liquid steam of polytetrafluoroethylene dispersion liquid. By arrangement of devices such as a defoaming pot, a gas-liquid separator and a falling film absorption tower, etc., the system of the present invention effectively remove the products and emulgators in the concentration and evaporation processes, the liquid obtained by such method has a conductivity below 1 µs·cm$^{-1}$, after cooling, it can be used in circulations as an absorbent or used in circulations as industrial water. Each concentration system can save water consumption of about 65 thousand tons per year, so the economic and social effects are significant.

What is claimed is:

1. A system for purifying mother liquid steam of polytetrafluoroethylene dispersion liquid, used for purifying the mother liquid steam generated by a concentration kettle, and the system comprising:
   a defoaming pot,
   a gas-liquid separator, and
   a falling film absorption tower,
      wherein a steam exit of the concentration kettle is connected to an entrance of the defoaming pot, an exit of the defoaming pot is connected to a feeding port of the gas-liquid separator, a gas exit of the gas-liquid separator is connected to the falling film absorption tower, and a liquid exit of the gas-liquid separator is connected to the concentration kettle.

2. The system of claim 1, wherein the defoaming pot is provided with 2-10 polyporous plates arranged horizontally.

3. The system of claim 1, wherein the gas-liquid separator is provided with 2-10 baffles arranged horizontally with airflow passages between the baffles.

4. The system of claim 1, further comprising:
   a pool sealed with liquid,
   a circulation pump, and
   a plate type cooler,
      wherein the pool is connected to an exit of the falling film absorption tower, the plate type cooler is connected to the pool by the circulation pump, a water exit of the plate type cooler is connected to an absorbent entrance of the falling film absorption tower, and the top of the falling film absorption tower is connected to a vacuum pump.

5. A method for purifying mother liquid steam of polytetrafluoroethylene dispersion liquid by using the system of any one of claims 1-4, and the method comprising:
   transporting evaporated mother liquid steam into the defoaming pot to be defoamed,
   transporting defoamed mother liquid steam into the gas-liquid separator,
   forming separated liquid and separated mother liquid steam using the gas-liquid separator,
   transporting the separated mother liquid steam into the falling film absorption tower to be absorbed as a liquid, and
   returning the separated liquid to the concentration kettle.

6. The method of claim 5, wherein the polytetrafluoroethylene dispersion liquid comprises 20~30% polytetrafluoroethylene, and 6~8% emulgator sodium dodecylbenzene sulphonate by mass content.

7. The method of claim 6, wherein the liquid absorbed by the falling film absorption tower exits the falling film absorption tower and enters into a pool connected to a plate type cooler.

8. The method of claim 7, wherein the liquid absorbed by the falling film absorption tower is transported with a circulation pump to the plate type cooler for cooling, and then as an absorbent of the falling film absorption tower.

9. The method of claim 5, wherein the concentration kettle has a pressure of −0.08~0.09 MPa and a temperature of 50~55° C.

10. The method of claim 7, wherein the liquid absorbed by the falling film absorption tower exits the falling film absorption tower and enters into a pool connected to a plate type cooler.

11. The method of claim 10, wherein the liquid absorbed by the falling film absorption tower is transported with a circulation pump to the plate type cooler for cooling, and then as an absorbent of the falling film absorption tower.

12. The method of claim 5, wherein the liquid absorbed by the falling film absorption tower is water having a conductivity of 0.2~1 µs·cm$^{-1}$.

13. The method of claim 8, wherein the liquid absorbed by the falling film absorption tower exits the falling film absorption tower and enters into a pool connected to a plate type cooler.

14. The method of claim 13, wherein the liquid absorbed by the falling film absorption tower is transported with a circulation pump to the plate type cooler for cooling, and then as an absorbent of the falling film absorption tower.

15. The method of claim 5, wherein the liquid absorbed by the falling film absorption tower exits the falling film absorption tower and enters into a pool connected to a plate type cooler.

16. The method of claim 15, wherein the liquid absorbed by the falling film absorption tower is transported with a circulation pump to the plate type cooler for cooling, and then as an absorbent of the falling film absorption tower.

* * * * *